United States Patent [19]

Deitz et al.

[11] B 4,040,802

[45] Aug. 9, 1977

[54] ACTIVATION OF WATER SOLUBLE AMINES BY HALOGENS FOR TRAPPING METHYL RADIOACTIVE IODINE FROM AIR STREAMS

[75] Inventors: Victor R. Deitz, Chevy Chase; Charles H. Blachly, West Hyattsville, both of Md.

[73] Assignee: United States Energy Research and Development Administration, Washington, D.C.

[21] Appl. No.: 570,925

[22] Filed: Apr. 22, 1975

[44] Published under the second Trial Voluntary Protest Program on March 23, 1976 as document No. B 570,925.

[51] Int. Cl.² ............................................. B01D 53/04
[52] U.S. Cl. ......................................... 55/71; 55/74; 252/444
[58] Field of Search ........................... 55/74, 71, 387; 252/415, 438, 444

[56] References Cited

U.S. PATENT DOCUMENTS

| 3,429,103 | 2/1969 | Taylor | 55/74 |
| 3,453,807 | 7/1969 | Taylor | 55/74 |

*Primary Examiner*—Bernard Nozick

[57] ABSTRACT

Gas adsorbent charcoals impregnated with an aqueous solution of the reaction product of a tertiary amine and elemental iodine or bromine are better than 99 per cent efficient in trapping methyl iodine[131]. The chemical addition of iodine or bromine to the tertiary amine molecule increases the efficiency of the impregnated charcoal as a trapping agent, and in conjunction with the high flash point of the tertiary amine raises the ignition temperature of the impregnated charcoal.

1 Claim, 1 Drawing Figure

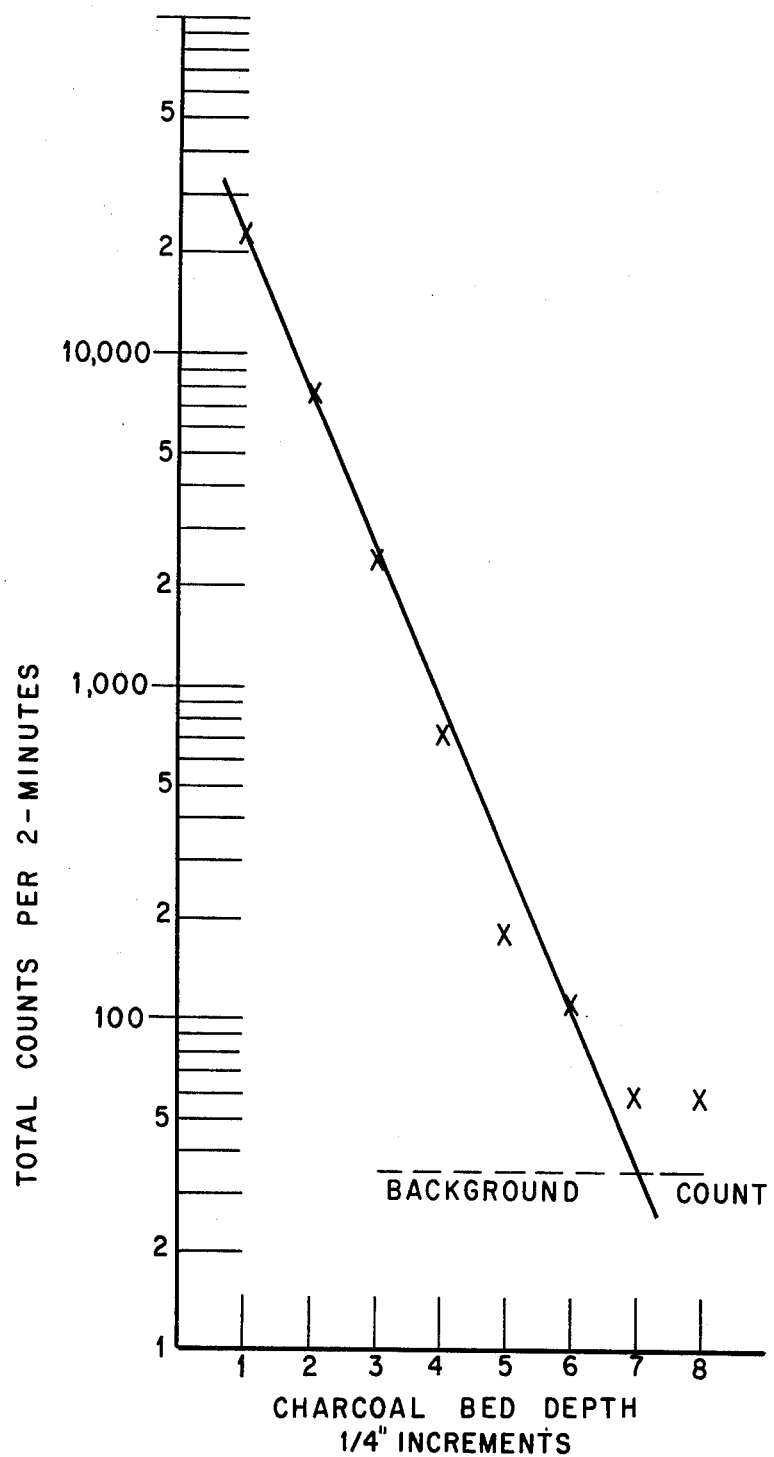

ACTIVATION OF WATER SOLUBLE AMINES BY HALOGENS FOR TRAPPING METHYL RADIOACTIVE IODINE FROM AIR STREAMS

BACKGROUND OF THE INVENTION

All nuclear reactor systems must interface with the environment through an adsorbent system, normally charcoal, and a high efficiency particulate filter. Iodine[131] is one of the important fission-product gases that must be trapped from reactor air streams; some of this nuclide is in the form of methyl iodide.

In efforts to remove this fission-product certain impregnated charcoal products have been used. Of particular interest has been triethylene diamine (TEDA) because of the rapid rate of reaction of this inpregnant with air borne methyl iodide. However, even higher reaction rates are desired.

In addition to adsorption characteristics, a very important property of impregnated charcoals is the magnitude of the spontaneous ignition temperature. In general, impregnated charcoals ignite at temperatures considerably below that of the base charcoal, usually in the neighborhood of the flash point of the impregnant.

DESCRIPTION OF THE INVENTION

It has been discovered that elementary iodine crystals, liquid bromine, or iodine chloride can be completely reacted at ambient temperatures in aqueous solutions with tertiary amines, and that charcoal impregnated with these solutions is an effective adsorbent for iodine fission products such as iodine[131] and methyl iodide[131]. These amine-iodine reaction products not only increase the adsorption efficiency of the amine impregnated charcoal but also raise its ignition temperature.

In carrying out this invention the iodine is added as finely divided crystals and the bromine or iodine chloride are added as liquids to a solution of the tertiary amine; the concentration of the tertiary amine in the solution may range between 8 g/100 ml and 25 g/100 ml. The concentrations depend on the solubility of the amine in water and the quantity of water is controlled by the desired final moisture content after impregnation. The resulting impregnated charcoal will contain 2 to 7 per cent of tertiary amine and 0.4 to 1.6 per cent of a halogen based on the dry weight of the charcoal. In preparing the adsorbent material any charcoal suitable for gas adsorption may be used. Examples of water soluble tertiary amines which may be used are hexamethylenetetramine, triethanolamine, triethylenediamine, N-methylmorpholine, N, N, N', N' - tetramethylethylenediamine, 1-dimethylamino-2-propanol, N-methylpiperazine, and N, N, N', N'-tetramethyl-1,4-butanediamine. The concentrations of tertiary amine and of halogen in the aqueous solution that is best suited for the impregnation of a charcoal will vary with the amine and the halogen. There is an optimum range below and above which the trapping efficiency falls off. Also, the impregnation is best accomplished with a quantity of water that leaves the product of a dry appearance.

This invention may be best illustrated by the information generated by using hexamethylenetetramine (HMTA) as an example of a tertiary amine and crystalline iodine as an example of the halogen. A number of samples of charcoal impregnated with varying amounts of HMTA alone and HMTA with iodine were prepared and, after drying, these were exposed to a gas stream containing methyl iodide[131]. The results of these tests are summarized in Table I. As can be noted in the first part of Table I, the penetration of methyl iodide through a one-inch or two-inch thick bed of the HMTA impregnated charcoal is seen to be considerable when impregnated with the amine alone. A remarkable increase in adsorption is observed when the formulation includes iodine added to HMTA as shown in the second part of Table I.

In these tests the charcoal bed in all cases was two inches in diameter and the air flow for pre-equilibration with air at the humidity 95 ± 2% relative humidity was 5.5 liters/min. and the flow was increased to 11 liters/min. for the subsequent test period of four hours. The dose of methyl iodide labeled with $I^{131}$ in this four hour period was 25 μg/g. of impregnated charcoal of activity which permitted total counts up to 300,000 in 2 minutes. Each sample bed was divided into 8 equal parts, each of ¼ inch depth, separated by stainless steel wire screens. However, the percentage of penetration is depicted in Table I in terms of four parts taken together.

TABLE I

Trapping Efficiencies of Charcoals Impregnated with HMTA-Iodine Solutions as % Penetration of Methyl $I^{131}$

| Run No. | HMTA (wt% of the charcoal) | $I_2$ | % Penetration 1" bed | 2" bed |
|---|---|---|---|---|
| 1 | 5 | 0 | 41% | — |
| 2 | 5 | 0 | 50 | — |
| 3 | 5 | 0 | 30 | — |
| 4 | 5 | 0 | — | 20% |
| 5 | 5 | 0.5 | 16.3 | 2.3 |
| 6 | 7 | 1.0 | 7.0 | 0.54 |
| 7 | 10 | 1.0 | 7.5 | 0.36 |
| 8 | 7 | 2 | 3.9 | 0.00 |
| 9 | 5 | 1 | 0.00 | 0.00 |
| 10 | 5 | 1 | 0.00 | 0.00 |
| 11 | 4 | 1 | 6.7 | 0.53 |
| 12 | 7 | 1 | 10.2 | 0.65 |

The iodine crystals and the amine were reacted at ambient temperature in the designated proportions (weight percent of the charcoal) given in the lower part of Table I. Each solution was clear and almost colorless and proved stable over long storage periods. After spray impregnation and drying the observed trapping efficiencies were dramatically increased over the amine alone as shown in Table I.

Since each sample bed was divided into 8 equal parts, it was possible to report as the FIGURE shows the dependence of penetration on charcoal depth. A linear plot is valid for logarithm activity as a function of bed depth; it is possible from this behavior to estimate the depth of charcoal required for the effluent to reach the background count. In typical plot is shown for example, the effluent air streams from Runs 9 and 10 in Table I attained background activity with a charcoal depth of three-fourths inch. In these tests the amount of methyl iodide[131] removed is substantially the same as the amount of methyl iodide[131] removed in the air stream from an intermediate size nuclear reactor which has been operating for about 2 years.

In a separate series of tests, elementary bromine was reacted at room temperature with an aqueous solution of HMTA. Table II shows the amine to bromine proportions and the observed penetrations of $I^{131}$ in the form of methyl iodide after impregnation in charcoal.

TABLE II

Trapping Efficiencies of Charcoals Impregnated with HMTA-Bromine Solutions Determined by % Penetration of Methyl $I^{131}$

| Experiment No. | HMTA (wt%) | $Br_2$ (wt%) | % Penetration 1" bed | % Penetration 2" bed |
|---|---|---|---|---|
| 13 | 9 | 0.8 | 19 | 4.8 |
| 14 | 5 | 3.2 | 24.5 | 5.8 |
| 15 | 9 | 0.9 | 19.9 | 5.1 |
| 16 | 7 | 1.6 | 26.4 | 7.8 |
| 17 | 0 | 1.6 | 40.6 | 18 |
| 18 | 2.5 | 0.9 | — | 10 |

Here again the depth of charcoal that is required for the effluent air stream to reach background can be estimated. From the tests summarized in Tables I and II it is evident that the iodine complex has been found to be significantly more efficient than bromine using charcoal in bed depths of one or two inches.

The introduction of the halogen (bromine, iodine chloride, and iodine) into the amine impregnation formulation also raised the ignition temperature observed for the charcoal. This feature is of the greatest importance inasmuch as the adsorption of methyl iodide[131] from the reactor effluent may take place at elevated temperatures.

EXAMPLE 1

Hexamethylenetetramine (62.1 g.) was dissolved at room temperature in 200 ml. distilled water. Crystalline iodine (12.42 g.) was added with vigorous stirring. The first indication of reaction was the immediate development of a yellow coating on the iodine crystals, followed by an amber yellow coloration of the solution. With continuous stirring, the mixture then attained a yellow murky appearance which soon become muddy brown. The stirring was continued overnight, and the mixture gradually become less murky and finally clear and almost colorless. The solution was diluted to 800 ml. and was impregnated on 3000 ml. of gas adsorbent charcoal (coal-base). The charcoal was rotated at 31 r.p.m. and the solution was sprayed under pressure into the charcoal through a flat spray nozzle tip. The product was freeflowing and was air dried in a forced-convection oven at 100°C overnight. The penetration of methyl iodide ($I^{131}$) was observed to be zero through a bed depth of two inches (2-inch diameter) and 5% through a bed depth of 1 inch.

EXAMPLE 2

N, N, $N^1$, $N^1$-Tetramethyl 1,4-butanediamine (5 g.) was dissolved in 25 ml. water. Crystalline iodine (1.0 g.) was added and the mixture stirred vigorously. The appearance of the mixture changed from a turbid bright yellow to a muddy brown, and with prolonged stirring, all at room temperature, the solution became clear and colorless. The solution was impregnated on 100 g. of a coal-base adsorbent charcoal. A rotary mixer (31 r.p.m.) with four lifting vanes was used and a laboratory atomizer, operated with pulsed filtered air supply, was used to introduce the solution. The impregnated charcoal was free-flowing and was air-dried by drawing warm air through a heated column of charcoal. The volume of resultant condensate was 20 ml. and had a pH of 7. The penetration of methyl iodide ($I^{131}$) was observed to be zero through a sample bed of 2-inch diameter and 2-inch depth and 0.0% through a bed 2-inch diameter and 1-inch depth.

What is claimed is:

1. In the method of removing methyl iodine[131] gas from the effluent of a reactor by passing the effluent gas through an organic impregnated charcoal, the improvement comprising employing an impregnated charcoal prepared by contacting charcoal with an aqueous mixture of a halogen selected from the group consisting of iodine and bromine, and a tertiary amine selected from the group consisting of hexamethylenetetramine, triethyanolamine, triethylenediamine, N-methylmorpholine, N, N, N', N'-tetramethylethylenediamine, 1, dimethylamino-2-propanol, N-methylpiperazine, and N, N, N', N'-tetramethyl-1,4-butanediamine, wherein the concentration of halogen in the charcoal is between 0.4 and 1.6%, and the concentration of tertiary amine in the charcoal is between 2 and 7%, based on the weight of the charcoal.

* * * * *